(12) United States Patent
Holdaway

(10) Patent No.: US 6,211,642 B1
(45) Date of Patent: Apr. 3, 2001

(54) OPEN-LOOP STEP MOTOR CONTROL SYSTEM

(75) Inventor: Charles R. Holdaway, San Diego, CA (US)

(73) Assignee: Alaris Medical Systems, Inc., San Diego, CA (US)

(*) Notice: Subject to any disclaimer, the term of this patent is extended or adjusted under 35 U.S.C. 154(b) by 0 days.

(21) Appl. No.: 09/356,785

(22) Filed: Jul. 20, 1999

Related U.S. Application Data

(63) Continuation of application No. 08/526,468, filed on Sep. 11, 1995, now Pat. No. 6,016,044.

(51) Int. Cl.$^7$ ........................................ H02P 8/10
(52) U.S. Cl. ........................................ 318/696; 318/431
(58) Field of Search ........................ 318/685, 696, 318/430, 431

(56) References Cited

U.S. PATENT DOCUMENTS

| | | | |
|---|---|---|---|
| 3,746,959 | * 7/1973 | Kobayashi et al. | 318/696 |
| 3,757,193 | 9/1973 | Inaba | 318/696 |
| 4,016,472 | 4/1977 | Leenhouts | 318/696 |
| 4,255,693 | 3/1981 | Keidl | 318/685 |
| 4,300,223 | 11/1981 | Maire | 318/696 |
| 4,333,045 | * 6/1982 | Oltendorf | 318/696 |
| 4,353,020 | 10/1982 | Veale | 318/601 |
| 4,362,979 | 12/1982 | Cannon | 318/603 |
| 4,367,435 | 1/1983 | Bailey et al. | 318/313 |
| 4,375,049 | 2/1983 | Grand Chavin | 318/696 |
| 4,431,955 | * 2/1984 | Faedi et al. | 318/696 |
| 4,456,860 | 6/1984 | Cann et al. | 318/561 |
| 4,481,453 | 11/1984 | Welburn | 318/696 |
| 4,489,259 | 12/1984 | White et al. | 318/696 |
| 4,494,711 | 1/1985 | Van Pelt | 318/696 |
| 4,496,886 | 1/1985 | Gordon et al. | 318/254 |
| 4,506,207 | 3/1985 | Ferrari | 318/696 |
| 4,518,907 | 5/1985 | Figuere | 318/696 |

(List continued on next page.)

FOREIGN PATENT DOCUMENTS

| | | | |
|---|---|---|---|
| 3720748 | 2/1988 | (DE) | H02P/8/00 |
| 0 367 693 A1 | 5/1990 | (EP) | H02P/8/00 |
| PCT/US90/06926 | 7/1991 | (WO) . | |

OTHER PUBLICATIONS

Patent Abstract of Japan, Publication No. JP52003106, Publication Date Jan. 11, 1997, Driving Device for Pulse Motor Speed, p. 1 of 1.

Patent Abstract of Japan, Publication No. JP59106899, Publication Date Jun. 20, 1984, Control Device for Motor, p. 1 of 1.

*Primary Examiner*—Bentsu Ro
(74) *Attorney, Agent, or Firm*—Fulwider Patton Lee & Utecht, LLP

(57) ABSTRACT

A motor control system that reduces noise while reducing power requirements but providing sufficient torque. A one-phase-on drive mode modified to microstep between "one phase on" positions is used to accelerate the motor in a non-linear manner to a maximum speed. The microstep drive modes have a constant period, and the step rate of the motor is increased by decreasing the number of microsteps in succeeding steps of the motor. A modified full step waveform maintains the motor at the maximum speed, where the current to one winding of the step motor changes polarity within one motor step while the other remains approximately constant providing increased smoothness in the drive and reduced noise. The polarity changes in accordance with the inductance and the compliance voltage of the motor. A one-phase-on waveform modified to include microsteps between "one phase on" positions later decelerates the motor in a non-linear manner, and the motor stops in a detent position until another waveform of steps is delivered to the motor.

6 Claims, 9 Drawing Sheets

U.S. PATENT DOCUMENTS

| | | | |
|---|---|---|---|
| 4,584,512 | 4/1986 | Pritchard | 318/696 |
| 4,648,026 | 3/1987 | Petrick | 318/696 |
| 4,658,194 | 4/1987 | Richter et al. | 318/696 |
| 4,683,408 | 7/1987 | Inoue et al. | 318/696 |
| 4,714,867 * | 12/1987 | Palmin et al. | 318/696 |
| 4,749,931 | 6/1988 | Kegel et al. | 318/696 |
| 4,788,484 | 11/1988 | Bolash et al. | 318/696 |
| 4,855,660 | 8/1989 | Wright et al. | 318/696 |
| 5,340,108 | 8/1994 | Gerpheide et al. | 273/185 |
| 5,485,070 * | 1/1996 | Tominaga | 318/696 |
| 5,530,332 * | 6/1996 | Rees | 318/685 |

* cited by examiner

OPEN-LOOP STEP MOTOR CONTROL SYSTEM

This application is a continuation of application Ser. No. 08/526,468, filed Sep. 11, 1995, now U.S. Pat. No. 6,016,044.

BACKGROUND

The invention relates generally to motor control and more particularly, to open-loop step motor control systems that reduce acoustic noise while maintaining sufficient torque.

A step motor applies torque to its load in a series of discrete steps and consequently may act as a sound transducer, generating an audible tone with a fundamental frequency equal to its step rate. If the motor is to be operable over a wide range of step rates, one or more of these rates will probably excite resonant frequencies of the motor's mechanical load, or of the motor itself, resulting in the production of objectionable amounts of acoustic noise and in less efficient operation.

In the medical equipment field, it is usually desirable to lower the noise level of the equipment for the benefit of the patient and others. For example, infusion pumps containing step motors are generally located next to a patient and may operate for hours. It can be disturbing to a patient when the pump generates a large amount of noise. Additionally, certain medical equipment, including many infusion pumps, must be powered by a portable power supply having a limited reservoir of power, such as batteries, and therefore the equipment must be designed to consume as little power as possible. In this way, the equipment can support the patient for as long as possible before a battery change or recharge is required. Thus, lowered levels of noise and lowered levels of power consumption are desirable characteristics in infusion pumps and other medical equipment.

A source of acoustic noise in a step motor is the wave shape of the motor drive. The simplest means of driving a step motor is the "full step" mode in which a two-phase motor is driven by a current or voltage square wave of constant magnitude. In this mode, each step corresponds to one of $2^N$ possible motor winding current polarity states where N is the number of motor windings (or phases). This type of drive generates acoustic noise with high harmonic content due to the high angular acceleration resulting from the high rate of change of torque that occurs at the leading edge of each step. Additionally, where the drive rate is sub-optimum and the rotor reaches its position before the winding currents are switched, a damped oscillation of the rotor about the motor magnetic field position may occur with resulting excess noise and wasted power in providing negative torque to hold the rotor and energy is lost in merely heating the windings due to the resistance encountered.

The noise component can be reduced if the magnitude of the torque pulses is decreased by reducing the magnitude of the motor drive pulse. Such a reduction, however, also reduces the motor's available torque reserve, resulting in an increased risk of motor stall or "pull out" where "pull out" refers to the loss of synchronization because the load on the motor exceeds the power available to the motor to move the load, thus the motor "pulls out" of its movement cycle and loses one or more steps. This condition can result in positioning errors due to the lost steps.

Having an adequate torque reserve is necessary in the case where certain undesirable conditions may occur. In the medical field where a step motor is used to drive a pumping mechanism, such as a peristaltic pump, the head heights of the infusion fluid change, infusates may be particularly viscous, and cold temperatures may require greater power to move the peristaltic mechanism, for example. The motor's rated torque should be high enough to handle all of these circumstances but in any case, its rated torque plus its torque reserve must be high enough or motor pullout may occur. Typically, a mechanism has a rated torque and a torque reserve. In one embodiment, the reserve torque is set at seventy percent of the rated "no stall" torque.

It has been found that motor noise can be significantly reduced by the technique known as "microstepping." "Microstepping" is a means of driving a motor through a step with a series of current magnitude states that generate smaller angular displacements of the motor magnetic field vector position. The sum of these displacements equals that of one step. Because instantaneous torque is approximately a sinusoidal function of the angular displacement of a motor's field vector position from its rotor position, a smaller angular displacement results in a lower instantaneous torque. A lower instantaneous torque generates an angular acceleration at the leading edge of each "microstep" smaller than that which would be generated at the leading edge of each step in "full step" drive mode. The effect is to spread the large acceleration that normally occurs at the beginning of a step over the entire step as a series of small accelerations, thus reducing the level of acoustic noise.

However, "microstepping" is not a satisfactory noise reduction technique if power consumption must be limited, as in battery-powered applications. In the microstep technique, motor winding currents, that define the state sequence, must be maintained throughout the sequence, resulting in relatively high power consumption. Other lower power consumption step modes are available, such as "one phase on" mode where the winding currents are turned off after the initial acceleration to conserve power. However, these modes are noisier than the microstepping mode. Microstepping is also not desirable where controller bandwidth is limited. As the number of microsteps increases, the controller bandwidth requirement increases requiring greater hardware capability to support a faster clock speed. This greater ability results in increased expense and complexity.

The type of motor drive circuit can also have a direct effect on expense. For example, closed-loop drive circuits typically require sensors to provide the necessary feedback for control. The cost of the sensors as well as the additional processor bandwidth required to use the sensor inputs to control the drive circuit can result in a substantial increase in cost. An open-loop control system is preferable in this regard.

Thus, greater control over power consumption is important in applications where long battery life is desired. Providing excessive power to the step motor windings can cause wasted power and shortened battery life. Power can be lost as heat due to winding resistance. Similarly, moving the motor at its resonance frequency is inefficient and can result in wasted power because relatively little torque is created from the large input power that is provided to the motor. Thus precise motor control is desirable to avoid wasting limited energy.

Hence those skilled in the art have recognized the need for lowering the acoustic output of medical devices while also lowering the power consumption, but retaining an adequate torque reserve. Additionally, those skilled in the art have also recognized the need for an open-loop control system to reduce hardware and processor costs. The present invention fulfills these needs and others.

SUMMARY OF THE INVENTION

Briefly and in general terms, the present invention is directed to a control system for controlling the movement of a motor, the system comprising an energy source and a controller for controlling the application of energy to the motor from the energy source to control movement of the motor, wherein the controller applies energy to the motor in a non-linear increasing manner to begin movement of the motor. In another aspect, the controller removes energy from the motor in a non-linear decaying manner to stop movement of the motor.

In more detailed aspects, the controller applies energy to the motor in an exponentially increasing manner to begin movement of the motor and removes energy from the motor in an exponentially decaying manner to stop movement of the motor.

In further detailed aspects, the controller applies energy to the motor in multiple drive modes during acceleration from a stop, during operation at a constant speed, and during deceleration to a stop. In more detailed aspects, during the non-linear application of energy for acceleration of the motor, "one phase on" drive mode is modified to microstep between the "one phase on" motor step positions during movement of the motor. Upon reaching a desired speed, the controller applies energy to the motor in a full step drive mode to maintain the speed constant. During the non-linear removal of energy for deceleration of the motor to a stop, the controller applies energy in the "one phase on" drive mode modified to microstep between the "one phase on" motor positions ending with the motor placed in a "one phase on" position by a "one phase on" drive mode. During periods when the motor is stopped, the rotor is held in position with detent torque and no energy is applied.

In yet another aspect, the controller decreases the number of microsteps per motor step during periods of acceleration of the motor and increases the number of microsteps during deceleration.

In further aspects, the invention provides a motor control system for a step motor having at least two phases and a permanent magnet capable of defining a detent position. The control system comprises a motor controller providing a first and second mode drive signals to the step motor to accelerate the step motor in a rising non-linear manner to a constant speed. The motor controller provides a third mode drive signal to the step motor to maintain the constant speed, and the motor controller provides a fourth mode drive signal to decelerate the step motor from the constant speed in a non-linear decaying manner to the detent position, wherein the motor controller provides no drive signals to the motor after the motor stops in the detent position for a predetermined period of time.

In a further aspect, the motor is continuously run through a predetermined group of steps in a time frame and is then shut off for the remainder of the time frame to conserve power. The motor position is held during shut off by the detent torque of its permanent magnetic field.

Other aspects and advantages of the invention will become apparent from the following detailed description and the accompanying drawings, illustrating by way of example the features of the invention.

DETAILED DESCRIPTION OF THE PREFERRED EMBODIMENTS

Figure 1:
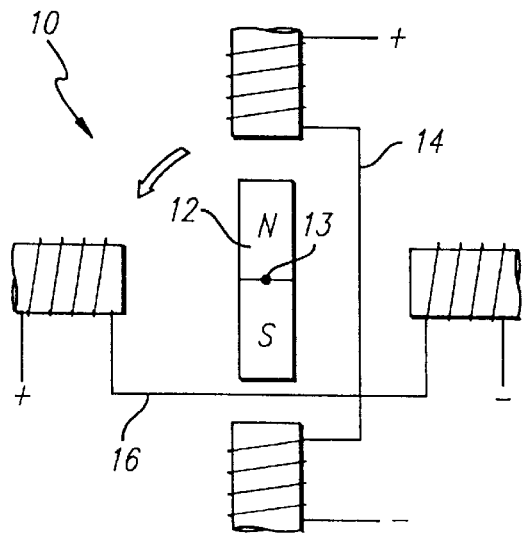
FIG. 1 is a block diagram illustrating a basic two-phase step motor.

In the following description, like reference numerals will be used to refer to like or corresponding elements in the different figures of the drawings. The following discussion will be based on the illustrative example of a two-phase step motor 10 as shown in FIG. 1. The step motor 10 includes a rotor 12 having a permanent magnet and being rotational about a pivot point 13, and two pairs of stator windings 14 and 16. Each stator winding represents a phase of the step motor. For purposes of discussion, the winding 14 will represent phase A, the winding 16 will represent phase B. The rotor 12 moves in steps in accordance with the magnitude and polarity of the current applied to the respective windings 14 and 16. If a current is passed through one of the windings, the resulting north and south stator poles of the energized winding 14 will attract the south and north poles of the rotor 12, respectively.

There are a number of drive modes for controlling the rotation of the rotor in a step motor. In a "one phase on" drive mode, one winding is fully energized while the other winding is turned off. By changing the current flow from the first winding 14 to the other winding 16, the stator field rotates ninety degrees. Lower power is required in this mode. This results in the rotor turning a step of ninety degrees. As is known in the art, steps of different degrees can be obtained using different rotor and stator configurations. In addition, if the two phase currents are unequal, the rotor will tend to shift to a position towards the stronger pole. The "microstep" drive mode utilizes this effect and subdivides the basic motor step by proportioning the current applied to the two windings. For example, by alternately energizing one winding and then two, the rotor moves through a smaller angular displacement and the number of steps per revolution is doubled. Higher resolution, better smoothness but some loss of torque result. This mode is commonly known as "half-step" drive mode.

For a two-phase step motor driven in "full step" drive mode, the two windings or phases are kept energized, and the current is alternately reversed in each winding on alternate steps. Greater torque can be produced under these conditions because all of the stator poles are influencing the motor. Their individual fields sum to produce a greater magnetic field. However, more power is consumed in this drive mode because both windings are constantly powered.

When there is no current flowing through the windings, the rotor will attempt to minimize the reluctance, or magnetic resistance, of its permanent magnet by aligning itself with the poles of one of the stator windings. The torque holding the motor in this position is referred to as the detent torque.

Figure 2:
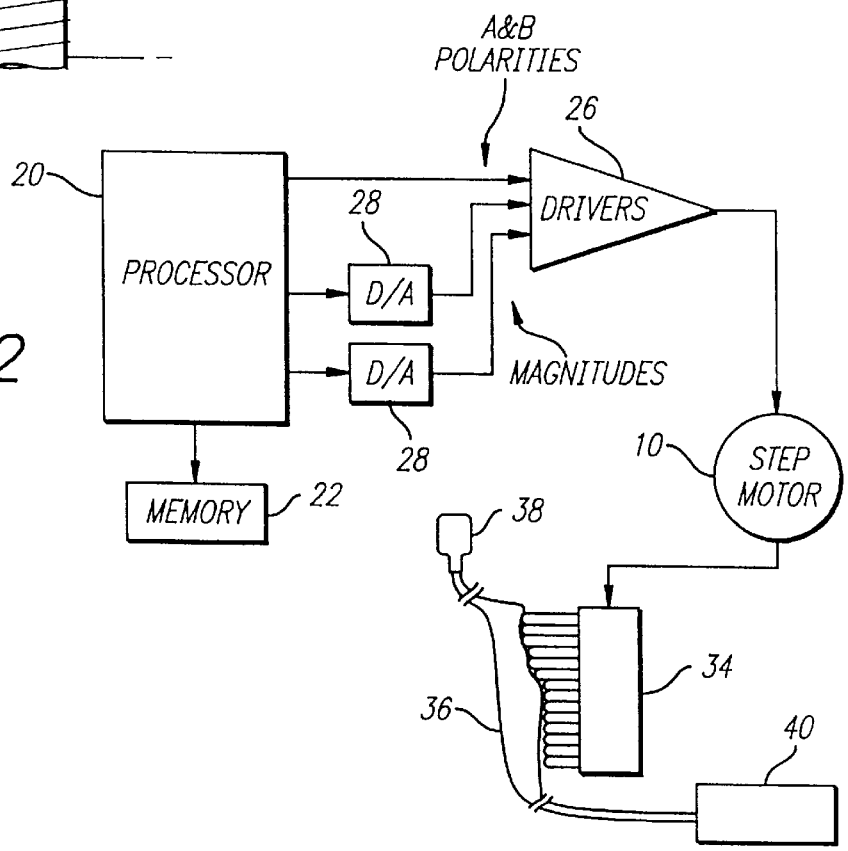
FIG. 2 is a block diagram of a controller for a step motor in accordance with an aspect of the invention and the application of the controller and step motor to the infusion of medical fluids to a patient.

FIG. 2 shows a processor 20 that provides signals for driving the step motor 10. In this embodiment, the processor 20 or other suitable digital system accesses data from look-up tables stored in a memory 22 so as to provide signals defining the waveform for driving the step motor 10 in a particular mode. The tables in memory 22 provide values for the polarities and magnitudes of the currents to be applied to the windings of the motor 10. The processor 20 supplies the polarity and magnitude signals to the drivers 26 for providing the proper currents to the windings of the step motor 10. The values are put through a D/A converter 28 to convert them to analog signals before being input to the drivers 26.

Figure 3:
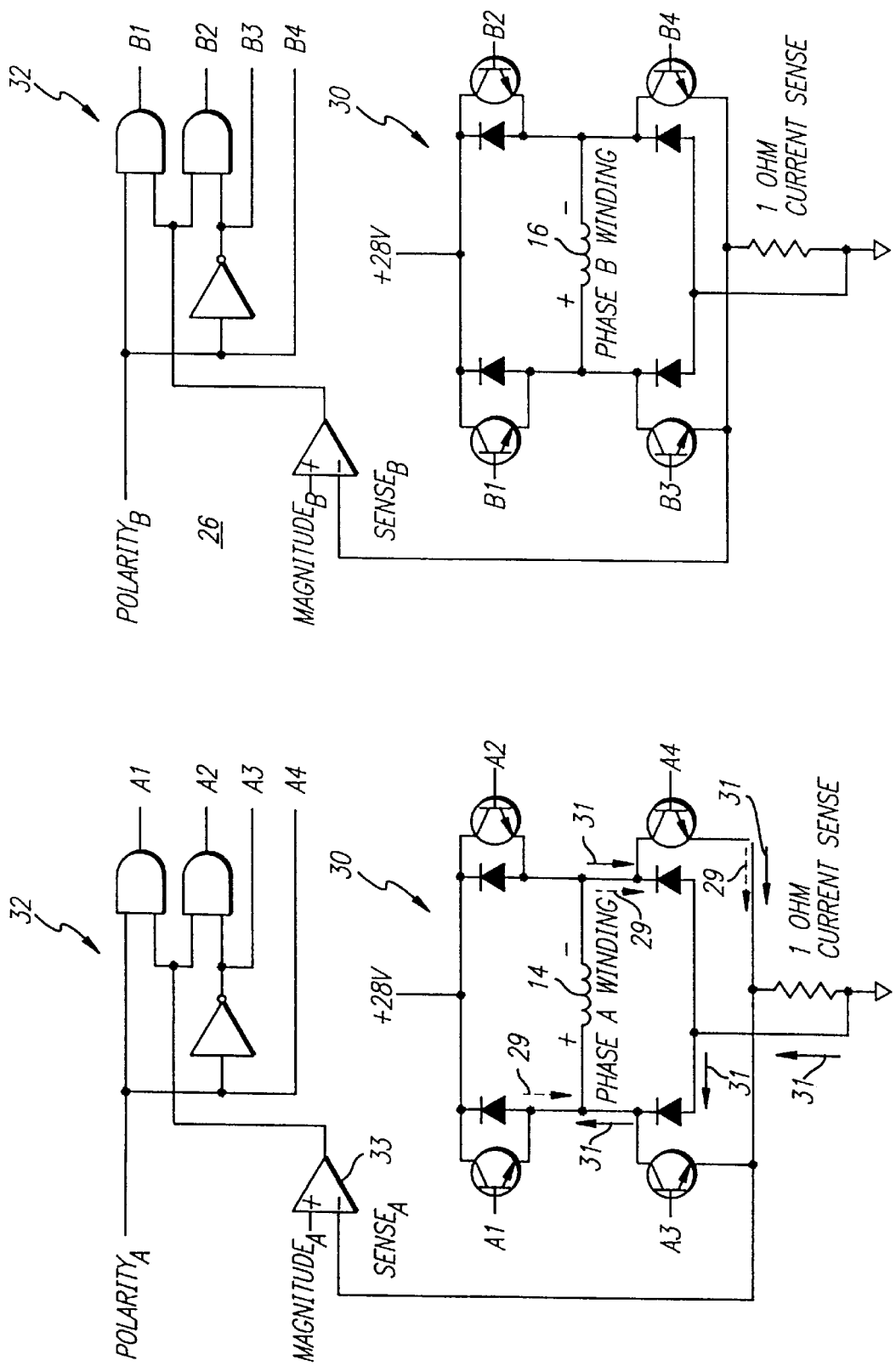
FIG. 3 is a circuit diagram of the drivers and motor windings shown in FIG. 2 in accordance with an aspect of the invention.

As shown in FIG. 3, the drivers 26 for the windings 14 and 16 of the two-phase step motor 10 comprise a pair of H bridges 30 controlled by the processor. The magnitudes of the H bridge current outputs are controlled by choppers 32. The choppers 32 act to turn the motor drive on or off as required to minimize the difference between the sense and the magnitude signals at the comparator inputs 33. The magnitude signals are generated via the D/A converters 28 (FIG. 2). The processor 20 switches between the separate tables stored in the memory 22 that contain the specific data for providing the appropriate waveform to drive the step motor. The memory 22 in one embodiment contained multiple look up tables, each of which was available to the processor for use during operation of the motor through each group of steps. The processor is thus able to change motor drive waveforms "on the fly" and automatically does so as described herein. The look up table index is changed during motor rotation so that the processor always has the proper waveforms available for controlling the motor. For example, a look up table was stored for the acceleration waveforms and another was stored for the full step waveform.

FIG. 3 also shows drive current by arrows having dashed stems and decay currents by arrows having solid stems 31 for the phase A winding The choppers 32 turn the transistors A1 and A2 on depending on the result of the comparison of the magnitude signal to the sense signal by the comparator 33.

Figure 4:
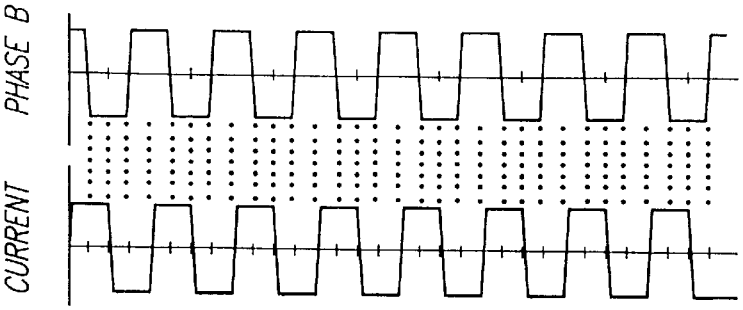
FIG. 4 presents waveforms of a constant rate two phase step drive for driving a two phase step motor.

In step motors 10 used with medical infusion pumps, such as the linear peristaltic pump 34 shown in FIG. 2 acting on a tube 36 connected between a fluid reservoir 38 and a patient 40, a full step drive mode shown in FIG. 4 at a constant step rate may not be the most efficient mode for operating the motor 10 to reduce noise and power consumption. As discussed above, the resulting step period can have an excessive duration in which the majority of motion of the motor occurs near the beginning of the period with power wasted as heat in the resistance of the windings 14 and 16 for the remainder of the period and objectionable noise resulting.

Figure 5:
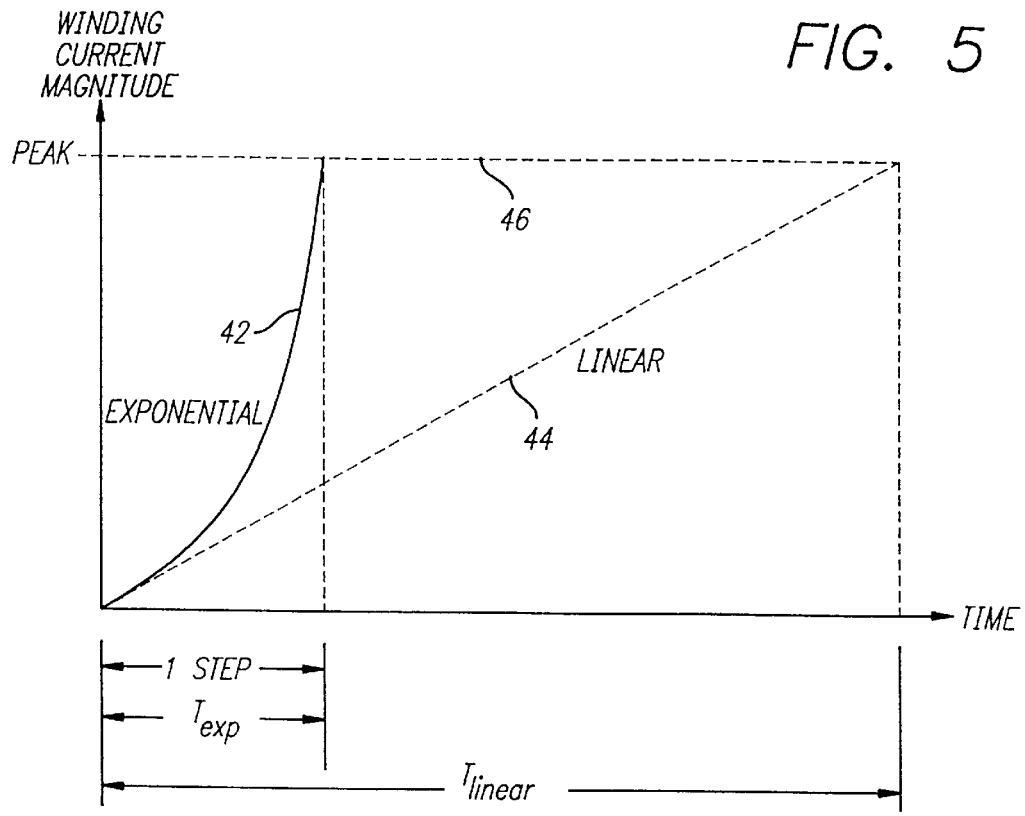
FIG. 5 is a graph of the non-linear application of energy to a motor to attain a peak winding current, in this case, an exponential application of energy is shown and is compared to a linear application of energy.

Referring now to FIG. 5, an embodiment is shown in which energy is applied to the motor in a non-linear manner to begin motor movement. The winding current 42 is applied in an exponentially using manner to cause the motor to attain its maximum torque at a rate faster than if a linear increase in winding current 44 were used. This approach results in smoothly transitioning to a high torque output with a low initial rate of increase of torque, thereby generating less noise and consuming less energy than if a linear approach were used. As shown in FIG. 5, the peak winding current 46 is attained much faster with the expenentially using application of energy to the motor than with the linear application. In this embodiment, the peak winding current is applied within one motor step. Although not shown, a like approach is used at the point of deceleration of the motor. The power is removed in a non-linear decaying manner, in this embodiment, an exponential decay.

Figure 6:
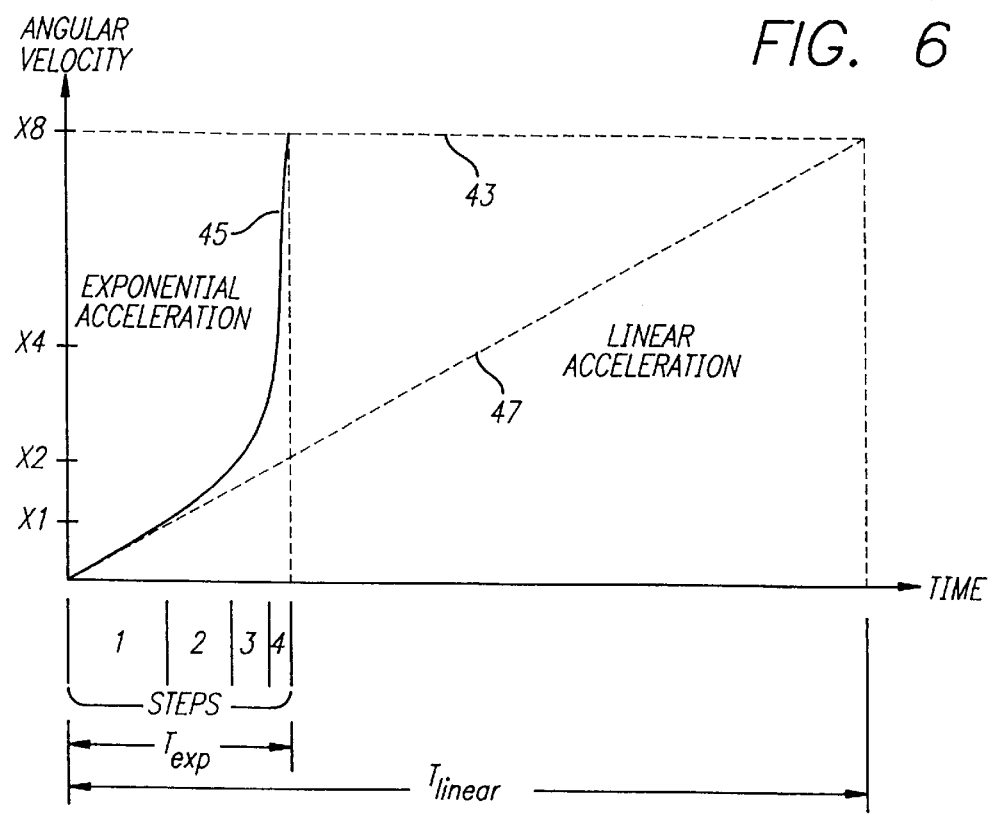
FIG. 6 is a graph of the non-linear acceleration of a motor in response to the exponential application of energy shown in FIG. 5, in this case, an exponential acceleration is shown and is compared to a linear acceleration.

FIG. 6 presents a graph of motor movement as a result of the exponential application of power shown in FIG. 5. The motor more quickly attains the maximum angular velocity 43 through exponential acceleration 45 than through a linear acceleration, 47. This will result in the motor passing through any resonance frequencies that may exist faster with less noise resulting than if the linear approach were used. In this embodiment, the motor has attained its peak angular velocity within four motor steps. Additionally, less power is required to get to the desired speed when accelerating exponentially.

Figure 7:
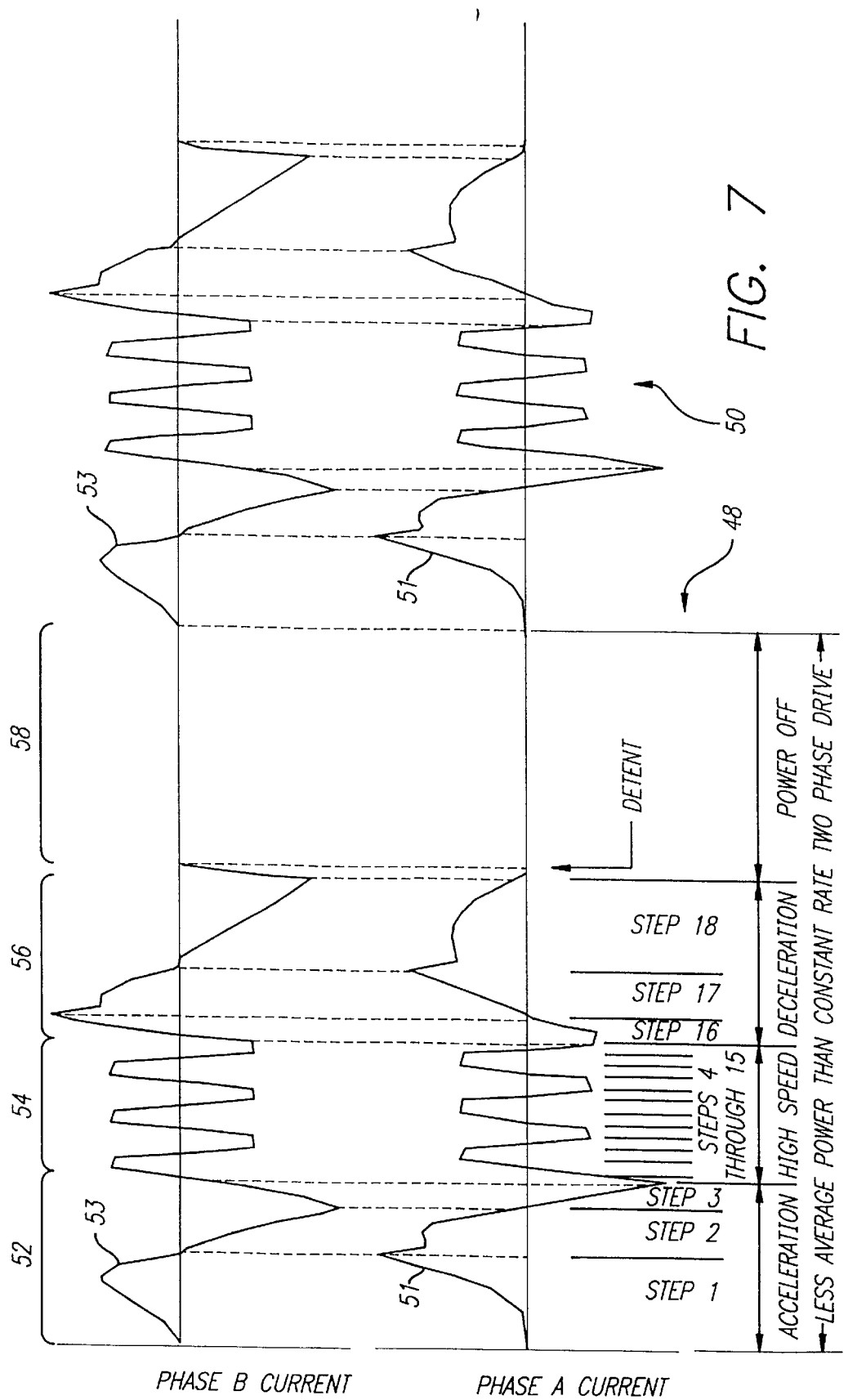
FIG. 7 includes graphs illustrating the use of multiple drive modes in controlling the application of energy to a step motor.

Referring now to FIG. 7, two time frames 48 and 50 of phase currents A 51 and B 53 for a step motor drive are shown. In each time frame, the motor is moved through a predetermined group of steps 52, 54, and 56 and is then stopped for the remainder of the time frame 58. Therefore, each time frame includes periods of acceleration 52, maximum step rate 54, deceleration 56, and power off or stop 58 (although numerals are only shown on one frame). In the unpowered interval in this embodiment, the rotor is held in position by the detent torque of its permanent magnetic field. It has been found that, for the same average step rate, driving the motor in the manner shown; i.e., non-linear acceleration to a selected maximum step rate, deceleration by a non-linear decay of step rate, and power off, results in the use of less average power to control the motor than the constant rate drive shown in FIG. 4.

Figure 8:
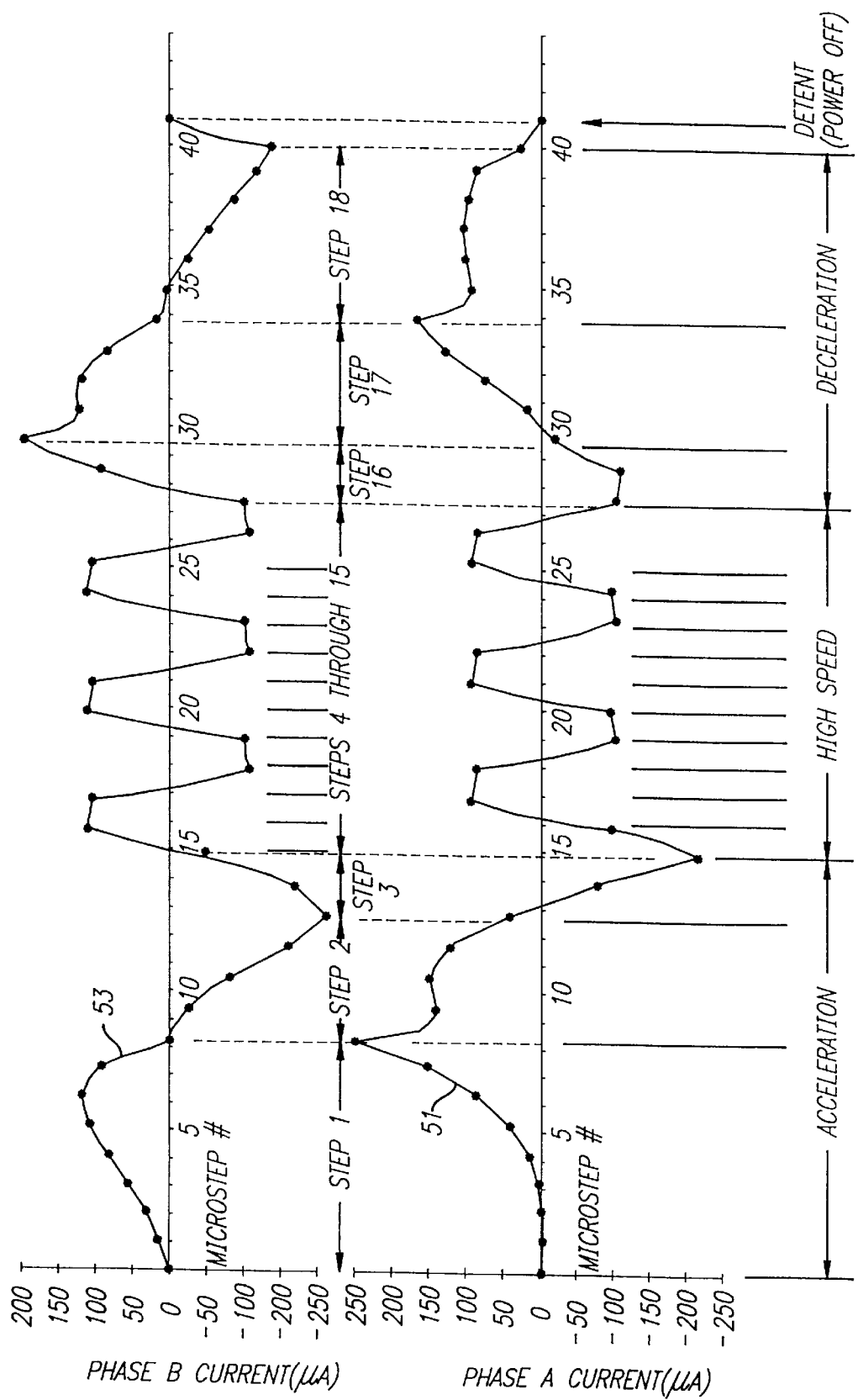
FIG. 8 illustrates in greater detail, certain waveforms of FIG. 7 in accordance with an aspect of the invention.
Figure 9:
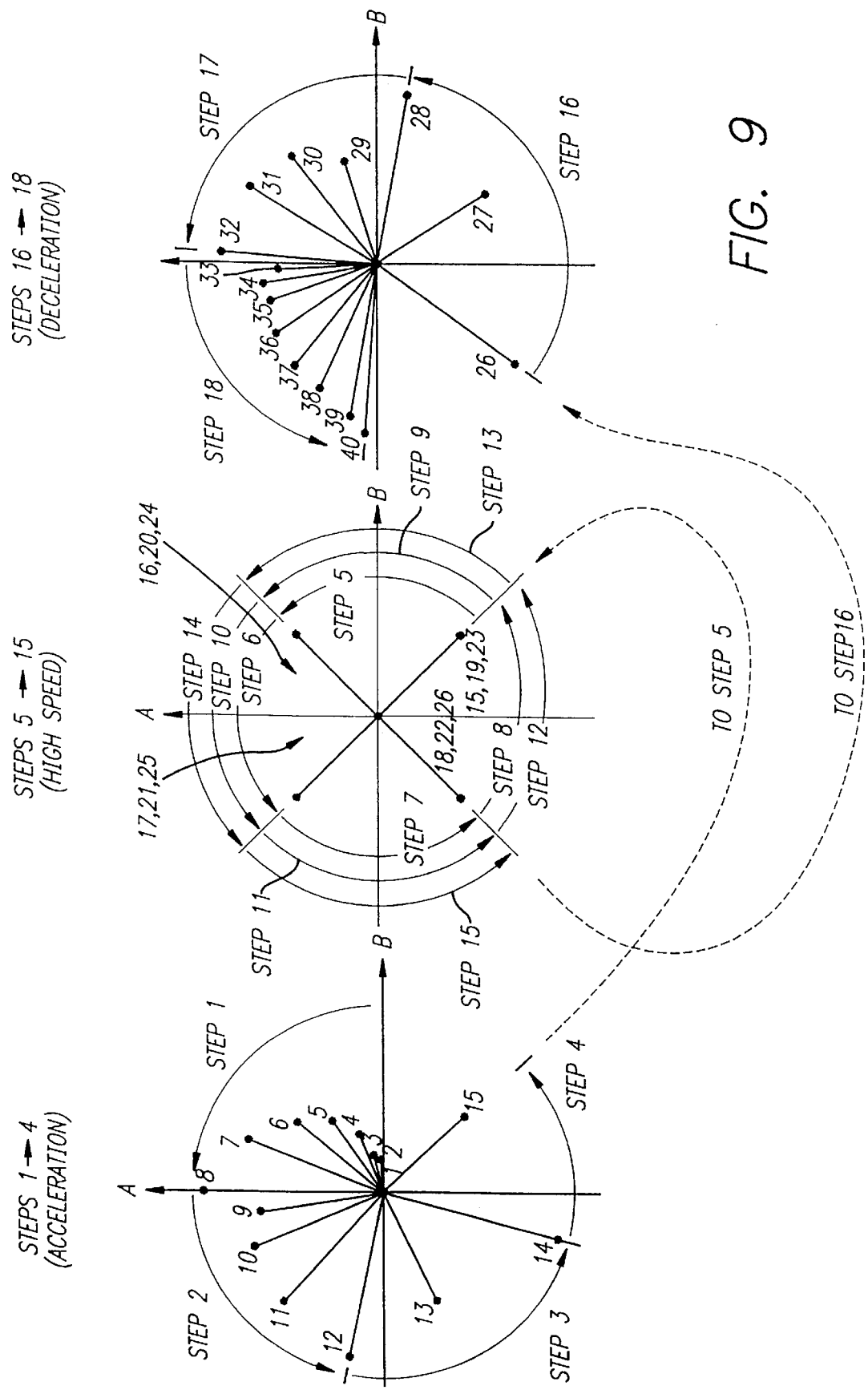
FIG. 9 includes vector diagrams of the drive modes of FIG. 8.

FIG. 8 shows two winding current waveforms 51 and 53 of the group of steps in a single time frame of FIG. 7 in greater detail. FIG. 8 will be considered with the vector diagrams in FIG. 9 in the following discussion. FIG. 9 contains graphs showing acceleration-deceleration and constant speed vector sequences for the two-phase step motor 10 driven by the waveform shown in FIG. 8. The graphs illustrate the three portions of the waveform, and their corresponding motor steps and microsteps. The vectors indicate the direction and magnitude of the motor magnetic field acting on the rotor 12 at each microstep. The acceleration portion illustrates the rapidly increasing step rate (i.e., decreasing microsteps for successive steps) as the rotor increases speed by use of a modified "one phase on" mode. The high speed portion maintained by the modified full-wave waveform maintains the motor's constant speed with accurate positioning. The deceleration portion illustrates the rapidly decreasing step rate as the motor decreases speed again with a modified "one phase on" mode. At microstep no. 40, the end of the deceleration portion, the rotor is near its detent position before current to the motor windings is discontinued. The rotor stops in a "one phase on" position before the winding is turned off. The rotor is then held in position by the detent torque produced by the permanent magnet of the rotor until the next group of steps is applied to the motor. This results in accurate positioning of the motor without use of current to hold the position.

During acceleration and deceleration, the motor is driven with a modified "one phase on" waveform. This corresponds to steps 1–4 and 16–18, wherein each step begins and ends with the motor in a detent position where the one energized winding or phase can be turned on or off without any resulting motor torque. In the actual embodiment shown, a modified "one phase on" drive mode is used to result in smoother acceleration by the motor. The magnetic field is not precisely in the detent position but is retarded somewhat at the end of acceleration in motor steps 2 and 3 to prepare the rotor for the transition to high speed drive. The field is similarly retarded slightly at the end of each deceleration step to prepare the rotor to coast to a stop precisely at a detent position at the moment the winding current is removed. The amount that the second winding is energized to accomplish this modification depends on the physical parameters of the motor. For example, the rotor moment of inertia, the frictional loads (static, gravitational, and viscous), the torque output of the motor, the strength of the detent field and the resistance and inductance of the motor windings all may affect the noise of the motor and can be considered in selecting the modification of the "one phase on" waveform.

The "one phase on" drive modes are modified to microstep between "one phase on" positions of the rotor during movement of the motor. The torque may be increased and a smooth field vector displacement sequence provided by temporarily energizing more than one winding during each step. Microsteps are used in the modified "one phase on" waveform to lessen the angular displacement and noise and to provide smoother acceleration for the motor. A preferred microstep sequence generates an exponentially rising current magnitude throughout the initial acceleration step as shown in FIG. 5.

As mentioned above, the motor is preferably accelerated at the beginning of the time frame at an exponentially rising step rate until the maximum step rate for the motor is attained in a minimum time. An exponentially rising step rate allows the step rate to move past the resonance frequencies of the motor more quickly, thereby reducing acoustic noise, after starting the motor from a stationary position with a low initial angular acceleration. The low initial angular acceleration permits use of a low initial motor torque, that may be expressed as:

$$\tau = J\alpha$$

where $\tau$ is the motor torque, $\alpha$ is the angular acceleration, and $J$ is the moment of inertia of the load.

Noise is reduced by starting the motor from a stationary position with a lower rate of change of torque than would occur with a linear increase in the motor current vector magnitude. The final current vector magnitude of a motor step must be sufficient to generate the required "torque reserve" that ensures motor startup with a worst-case mechanical load. A rising exponential current profile permits this final value to be attained in a given period, i.e., a step of the motor, with a lower initial rate of change of current and torque.

The low initial torque reduces power consumption as well as noise. Because torque is a linear function of winding current for operation below saturation, only a low initial winding current is required, that reduces power consumption. The current levels in the initial acceleration steps have the most significant effect on power consumption, as these steps are of the longest duration of the group of steps. All of the steps contain microsteps of constant period, and the initial acceleration steps contain the greatest number of microsteps. Use of an exponentially rising acceleration causes the motor to reach its desired maximum speed quickly. The acceleration waveform tables stored in the memory 22 can be programmed to increase the winding current as the acceleration progresses in order to supply the increasing torque level required to sustain a nonlinearly rising rate of acceleration. The tables stored in the memory contain the values for the microsteps for the step sequences of the waveform for driving the step motor.

Furthermore, the controller bandwidth requirement can be minimized by using microsteps having a constant period. The motor step rate on succeeding steps during acceleration can be increased by decreasing the number of microsteps per motor step and maintaining a constant microstep period, rather than by decreasing the microstep period and maintaining a constant number of microsteps per step. The microstep period is the shortest interval that must be resolved because the microstep determines the required bandwidth of the controller. Normally, acceleration is effected by decreasing this period to achieve a higher rate of microsteps per unit time. Increasing the microstep rate, however, requires an increased controller bandwidth. Keeping the microstep period constant during acceleration keeps the controller bandwidth requirement constant and equal to that for the lowest initial step rate. Since there is one microstep per motor step at the maximum rate, the motor step period at the maximum rate equals the microstep period at the lowest initial rate as shown in FIG. 8 where the microsteps are shown on the horizontal axes and motor steps are shown between the two graphs with arrows surrounding the number of the motor step. Decreasing the number of microsteps per motor step as the motor accelerates is acceptable, because at higher step rates the rate of change of torque is smoothed by the motor inductance, and the motor tends to be less sensitive to torque changes at high speeds.

Once the desired speed for the step motor 10 is reached, a modified full step waveform for the maximum constant rate portion of the group of steps is used for driving the two-phase step motor 10. A different waveform may be desirable for step motors having more than two phases. As shown in FIG. 8, for each step of the modified full step waveform 51 and 53, one winding current changes polarity smoothly while the other remains approximately constant. This is shown in more detail in FIGS. 10, 11A and 11B with phase A current 60 and phase B current 62. The rate at which the polarity change occurs is a function of the motor's inductance and of the motor driver's compliance voltage, as expressed by:

$$\frac{dI_{WINDING}}{dt} = \frac{V_{compliance}}{L}$$

Figure 10:
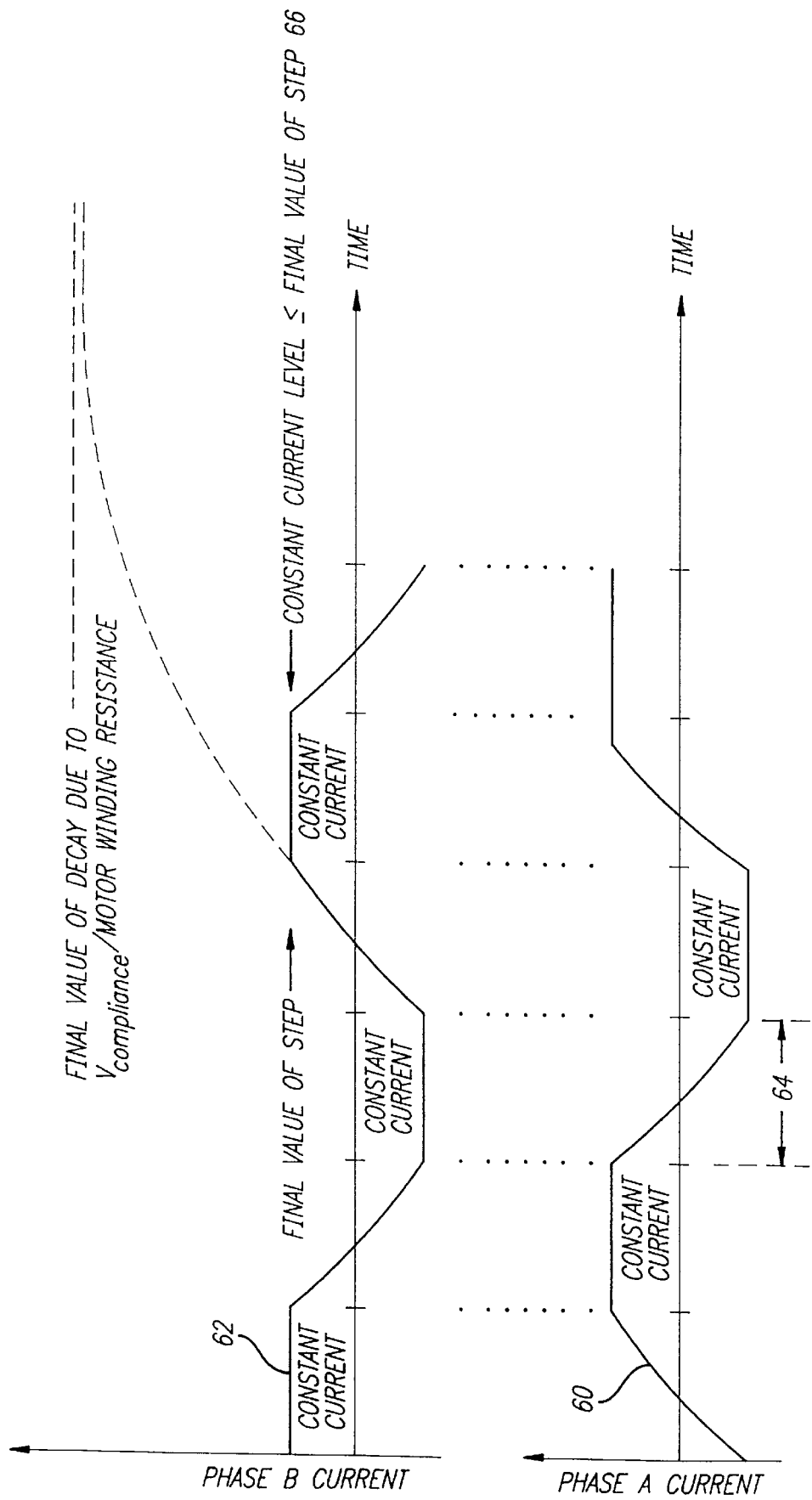
FIG. 10 illustrates the effect of motor inductance on winding current at high speed resulting in smooth magnetic field displacement.
Figure 11A:
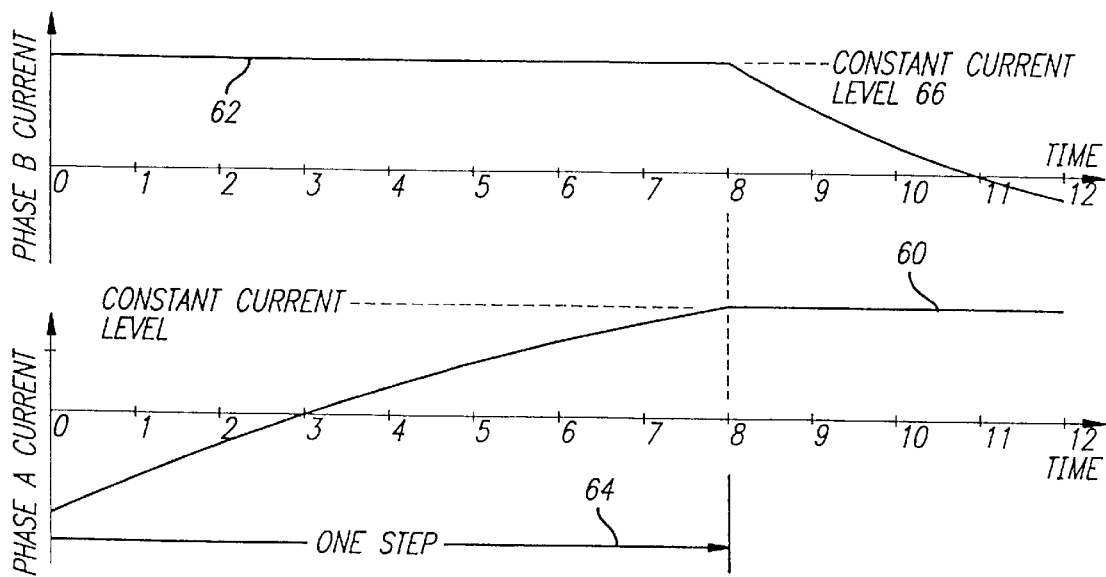
FIG. 11A illustrates one of the waveforms of FIG. 10 in further detail and in FIG. 11B, a vector diagram is shown.
Figure 11B:
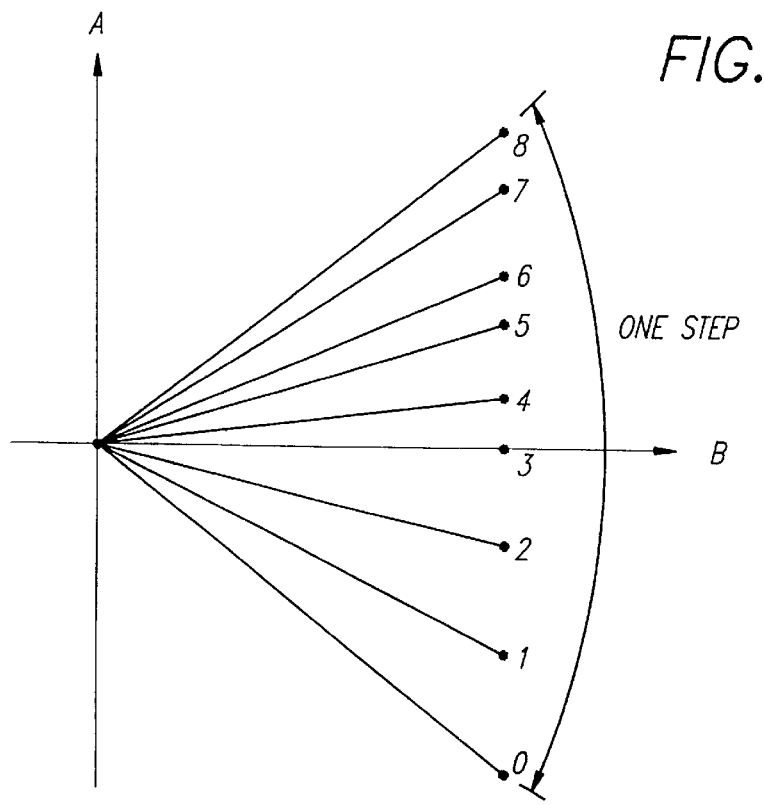

As $V_{compliance}$ of the controller and the motor inductance, L, are constant, the current in the winding undergoing polarity reversal changes approximately as a linear function of time until reaching its final value at the end of the step period. Some nonlinearity may be introduced by the resistance of the motor winding. The actual field vector displacement is a smooth analog function determined by the inductive decay of the motor windings as shown in FIGS. 10, 11A, and 11B. The other winding is held at a constant current 66 equal to or less than the final value of the decay. The constant current level 66 is selected to minimize power consumption while providing the required minimum high speed torque for the specified load.

When the motor is driven at its maximum speed, which is chosen to be well above its resonance, the acoustic noise normally associated with full step drive is reduced. Acoustic noise, and power consumption, can be reduced further by optimizing the constant current level as described above to a value that minimizes power consumption while providing the required minimum high speed torque for the specified load. This results in the "modified" full step drive mode. Since one component of the current vector is changing smoothly from initial to final value during each high speed step, the resulting field vector displacement (FIG. 11B) is smooth and less noise is produced. There is no increase required in the controller bandwidth over that of the lowest initial rate drive. As can be seen in FIG. 8, each step of the full step waveform 51 and 53 has a period that preferably equals the period of a microstep.

FIG. 11A shows more detail of part of a waveform of FIG. 10 with arbitrary time increments along the horizontal axis. The phase A current 60 can be seen smoothly transitioning polarity within one motor step (eight arbitrary time increments) with resulting lowered noise levels. These arbitrary time units are used once again in FIG. 11B to show the field vector displacement within the one motor step. Smooth vector rotation occurs without discrete steps that lead to higher noise levels. Rather than allowing the current to reach the final decay value shown in FIG. 10, the current decay is limited to the constant current level 66 so that it takes one motor step for the polarity reversal.

During deceleration, the motor is again driven with a "one phase on" waveform modified for microsteps between each "one phase on" position which begins and ends with the motor in a detent position, where the one energized winding or phase at the final step of the group can be turned on or off without any resulting motor torque. Microstep drive modes are interspaced with the "one phase on" drive positions to increase torque and to provide a smooth field vector displacement sequence. No power is required to hold the motor in the final stationary detent position for the group of steps. The permanent magnet in the rotor 12 holds the step motor 10 in the detent position. Thus power can be turned off between groups of steps to reduce the average power consumption of the step motor 10 over a time frame.

As the system progresses through the acceleration, high speed, and deceleration periods, the processor 20 switches table indices to progress through the separate tables that contain the acceleration, high speed, and deceleration waveforms. The number of steps in the time frame, the total time of the time frame, and the length of the unpowered interval are controlled by the processor 20 to precisely determine the average step rate of the motor. Certain medical devices, such as fluid pumps, may employ rotation at a selected average rate by grouping steps to dispense infusates at the proper dosage. For example, see U.S. Pat. application Ser. No. 08/305,617 filed Sep. 12, 1994 to Butterfield et al. entitled System for Increasing Flow Uniformity and incorporated wherein by reference.

Because the average step rate of the motor is determined by the number of steps in the step group and the unpowered interval between groups, the same maximum step rate and acceleration-deceleration profile can be used for any desired average step rate, and optimum efficiency can be achieved at all average step rates by selecting an optimally high step rate. The same compliance voltage for the step motor can be used at all average rates because the same maximum step rate for the motor is used. Only the number of steps in the group of steps and the unpowered interval need be changed to adjust the average rate desired for the motor. The compliance voltage is the maximum voltage required to maintain a specific value of current over a range of load resistances. The required drive algorithm and hardware are simplified from that required to optimize the efficiency of a motor using a maximum rate step drive because the same constant step rate is used to achieve any desired average rate. The same maximum step rate for the waveform, selected for optimum motor efficiency, is used regardless of the desired average step rate. When using a constant rate step drive, a lower and less efficient constant step rate must be used in order to attain the desired average step rate.

The step motor 10, when driven by the combination of drive modes described above has a lower average power consumption than one driven by a constant rate step drive signal. Low power consumption "one phase on" drive modes are used and no power is consumed during the time separating the step groups. The efficiency of the motor is optimized by selecting a high maximum step rate whose period matches the required winding current decay time determined by motor inductance and compliance voltage to achieve the waveform shown in FIGS. 10, 11A, and 11B.

Figure 12:
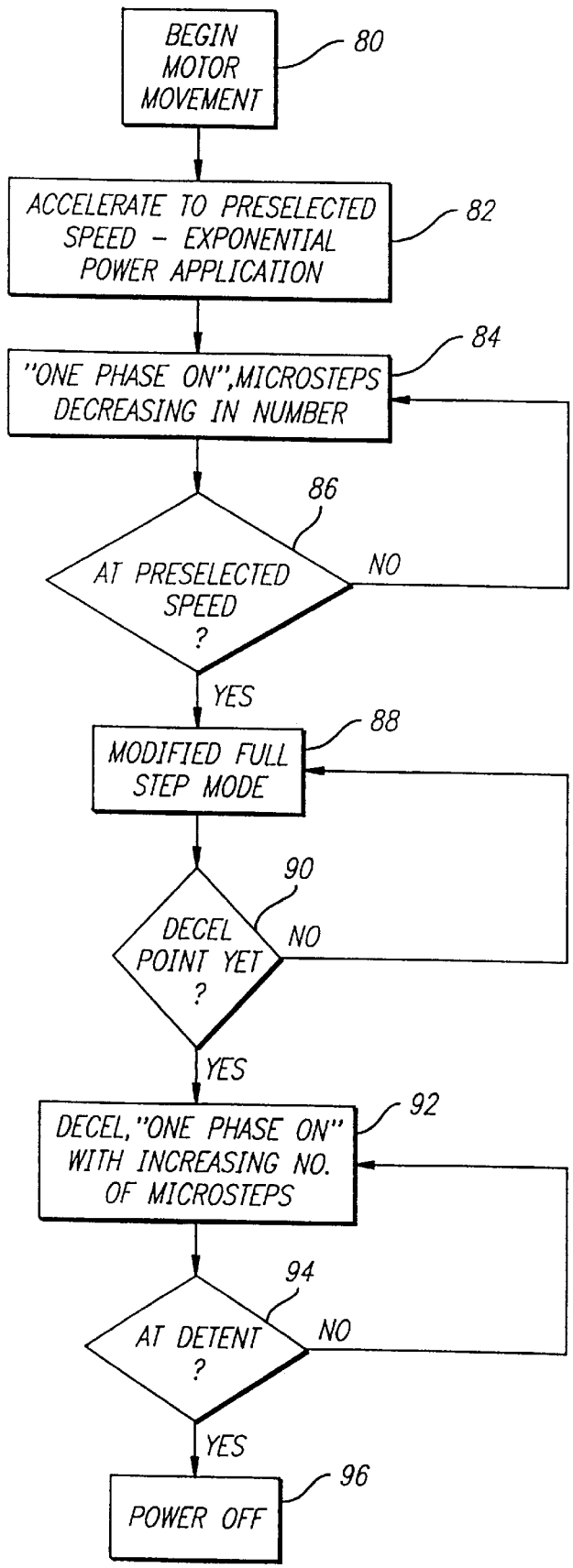
FIG. 12 is a flow chart of the control of a step motor in accordance with aspects of the invention.

FIG. 12 is a flow chart illustrating the operation of an open-loop control system in accordance with principles of the invention. When motor movement is to begin 80, the motor accelerates as a result of the exponential application of current to the windings 82. A "one phase on" drive mode modified to microstep between "one step on" positions is used with decreasing numbers of microsteps during acceleration 84. When the motor has reached a preselected speed 86, a modified full step drive is used 88. After having rotated the required number of steps at full step mode and now needing to decelerate 90, a "one phase on" mode modified to microstep between the "one phase on" positions with increasing numbers of microsteps for deceleration is used 92. The deceleration is effected through the exponential removal of power to the motor. When the motor is at a detent position 94, power is shut off 96.

While the invention has been illustrated and described in terms of certain preferred embodiments, it is clear that the invention can be subject to numerous modifications and adaptations within the ability of those skilled in the art. Thus, it should be understood that various changes in form, detail and usage of the present invention may be made without departing from the spirit and scope of the invention.

What is claimed is:

1. A control system for controlling the movement of a motor, the system comprising:

an energy source providing an electrical current;

a controller that controls the energy source to provide an exponentially increasing winding current to the motor in an exponentially rising manner to begin movement of the motor.

2. The control system of claim 1 wherein the controller removes winding current from the motor in an exponentially decreasing manner to stop movement of the motor.

3. The control system of claim 1 wherein the controller applies energy to the motor in a "one phase on" drive mode modified to microstep between the "one phase on" positions during movement of the motor.

4. The control system of claim 3 wherein the controller ends each motor step in a "one phase on" position during application of the modified "one phase on" drive mode.

5. The control system of claim 3 wherein the controller applies energy to the motor in a full step drive mode after the motor has achieved a preselected speed.

6. A method of controlling a step motor having at least two phases and a permanent magnet that defines a detent position at rest, comprising the steps of:

applying an exponentially increasing winding current in an exponentially rising manner to accelerate the step motor to a preselected motor speed;

maintaining the preselected speed for a first predetermined period of time; and exponentially decreasing the winding current to decelerate the step motor from the preselected speed to the detent position after the first predetermined period of time, wherein the motor stops in the detent position for a second predetermined period of time.

* * * * *

UNITED STATES PATENT AND TRADEMARK OFFICE
CERTIFICATE OF CORRECTION

PATENT NO. : 6,211,642 B1  
DATED : April 3, 2001  
INVENTOR(S) : Charles R. Holdaway Page 1 of 1

It is certified that error appears in the above-identified patent and that said Letters Patent is hereby corrected as shown below:

<u>Column 5,</u>  
Line 59, change "using", to read -- rising --.  
Line 65, change "using", to read -- rising --.

Signed and Sealed this

Second Day of October, 2001

Attest:

*Attesting Officer*

NICHOLAS P. GODICI  
*Acting Director of the United States Patent and Trademark Office*